Patented Sept. 12, 1939

2,172,406

UNITED STATES PATENT OFFICE 2,172,406

PROCESS OF PLASTICIZING REGENERATED CELLULOSE AND PRODUCT

James T. Power, Wilmington, Del., and Ernest G. Almy, Tamaqua, Pa., assignors to Atlas Powder Company, Wilmington, Del.

No Drawing. Application March 13, 1937, Serial No. 130,676

2 Claims. (Cl. 106—40)

This invention relates to the manufacture of filaments, sheets, films, etc., of regenerated cellulose and more particularly to the plasticizing, softening or conditioning of these materials.

This invention has for its principal object, therefore, the plasticizing, softening or conditioning of filaments, sheets or films of regenerated cellulose.

Another object of this invention is the accomplishment of the aforementioned plasticizing, softening or conditioning of filaments, sheets, films, and other shapes of regenerated cellulose by means of a novel conditioning material containing sorbitol or its anhydro derivatives.

Still another object of this invention is to accomplish the above objects by the use of a novel conditioning material containing sorbitol or its anhydro derivatives and producing greater flexibility together with greater constancy of moisture content under varying climatic conditions, with the attendant advantages of greater freedom from objectionable stickiness or tackiness and less changes in length or area due to shrinkage or swelling, than has been possible with prior conditioning materials.

Regenerated cellulose products in the form of films, sheets or filaments are commonly treated either during the course of their manufacture or after their manufacture with materials to reduce their brittleness, harshness and inflexibility, such as sulphonated castor oil, invert sugar syrup, glycerine, the glycols and the like. This invention relates to new materials for treating these products of regenerated cellulose so as to reduce their brittleness whereby the advantage of the prior materials are attained while at the same time attaining numerous advantages not attained heretofore and overcoming many disadvantages of the prior softeners and flexibilizers. These results are brought about by the use as a softener of an aqueous solution containing sorbitol or its anhydro derivatives.

The use of an aqueous solution of the hexahydric alcohol sorbitol or of its anhydro derivatives has proved to be outstandingly superior to the prior use of glycerine for softening regenerated cellulose. Glycerine acts to flexibilize regenerated cellulose by reason of its hygroscopic nature whereby it maintains a content of water in the film, sheet or filament of regenerated cellulose softened or flexibilized therewith. However, an appreciable content of water (8-10%) is necessary to the suppleness, softness and flexibility of regenerated cellulose. Glycerine has proven to be highly disadvantageous for use as a softener for regenerated cellulose, in many respects. Glycerine is excessively hygroscopic under conditions of high atmospheric humidity, and is not sufficiently hygroscopic under conditions of low humidity. The result is that regenerated cellulose films, etc., softened with glycerine become tacky or sticky when exposed to atmospheres of high relative humidity, if the proportion of glycerine added is sufficiently large to effect the desired flexibility when exposed to atmospheres of low relative humidity. Therefore, the commercial practice has become established of varying the amount of glycerine incorporated in such films, sheets, filaments, etc., according to the humidity under which the materials are to be employed. Thus it is customary to incorporate a larger percentage of glycerine in regenerated cellulose sheeting material in winter months when the relative humidity is low than in the summer months when the relative humidity is high. Such an expedient, though necessary with the use of glycerine, is obviously unsatisfactory since humidity conditions are continually changing in the same season, and even during the same day, and since the products frequently, if not almost always, are shipped, placed on sale, or consumed during other seasons than that for which they were designed.

Another disadvantage attending the use of glycerine in flexibilizing and softening regenerated cellulose products in sheetlike form arises from the fact that glycerine-softened regenerated cellulose films or sheets are not as impermeable to the transmission of moisture or water vapor as is desirable. This fact is particularly manifested where the regenerated cellulose sheet is used as a wrapping material, as in packaging, etc., where the undue permeability to moisture results in the transmission of moisture through the wrapping sheet to the interior of the package with undesirable effect upon the appearance, etc., and frequently resulting in deterioration of the contents of the package. The moisture permeability frequently allows the loss of moisture from the contents to the outside atmosphere where the atmosphere is relatively dry, rendering the packaged article less desirable.

A marked disadvantage attending the use of glycerine as a softener for regenerated cellulose is that regenerated cellulose filaments softened with glycerine vary objectionably in length upon changes in atmospheric humidity, contracting unduly under conditions of low humidity with resulting breakage and excessive tautness, and stretching excessively under conditions of high humidity with resulting looseness and limpness. The same disadvantage in greater degree attends the use of glycerine in regenerated cellulose films or sheets. The result is that films or sheets of regenerated cellulose softened with glycerine shrink considerably in area under conditions of low humidity and stretch undesirably under conditions of high humidity. This property manifests itself particularly where the sheetlike material is used as a wrapping material, the result being that under conditions of atmospheric dryness or low humidity the packaging material becomes objectionably taut with the consequence that it frequently breaks detracting greatly from the appearance and salability of the packaged article, and that under conditions of high atmospheric humidity the packaging material becomes limp and causes the package frequently to lose its shape, or sales appeal.

Still another difficulty attending the use of glycerine in the above connection lies in the fact that its vapor pressure is appreciable even at ordinary atmospheric temperatures and is greater at more elevated temperatures. The result is that it gradually volatilizes from the treated regenerated cellulose produce with the consequence that the flexibility and softness of the same are continually diminished and impaired. This effect is especially marked at the end of considerable periods of time.

The glycols, such as ethylene glycol and diethylene glycol, in general display the disadvantages of glycerine outlined above to an even greater extent. As a consequence they have been found to be practically useless for use as a softener for regenerated cellulose.

It has been discovered that regenerated cellulose may be flexibilized, softened or conditioned with an aqueous solution of sorbitol or of its anhydro derivatives and that the product so produced possesses none of the disadvantages attending the use of glycerine in this connection and possesses marked advantages over such use of glycerine. These results arising from the use of sorbitol in aqueous solution as a flexibilizer are wholly unexpected, since pure sorbitol is a crystalline solid having a melting point of 92-96° C. It has been found, however, that aqueous solutions thereof have desirable hygroscopic properties and conditioning value for regenerated cellulose. This is all the more unexpected since mannitol which is an isomer of sorbitol has no such properties. Moreover, as briefly pointed out above, and as more specifically set forth below, sorbitol is far superior to glycerin for use as a softener, or flexibilizer for regenerated cellulose.

Regenerated cellulose films, sheets, or filaments treated with sorbitol in aqueous solution show much less variation of water content and of such properties as softness, elasticity, flexibility, stickiness, etc., with passage of time or changes in humidity than do the same materials treated with glycerine.

Thus at low and intermediate relative humidities 20-40%, the moisture content of a sorbitol softened regenerated cellulose sheet is approximately the same as that of a glycerine softened regenerated cellulose sheet containing a proportion of glycerine equal to the proportion of sorbitol contained in the sorbitol softened sheet. At higher humidities, e. g. 80%, the glycerine treated sheet picks up much more moisture than the sorbitol treated sheet. The glycerine treated sheet becomes moist, sticky, and unpleasant to the touch, whereas the sorbitol treated sheet remains unchanged in these respects under the same conditions. This difference is very important where regenerated cellulose sheeting is to be used in packaging since in moist climates or on days of high humidity, the development of any stickiness causes the package to pick up dust, lose its neat glossy appearance, and decrease greatly in its sales appeal. Consequently, sorbitol softened regenerated cellulose displays a much greater constancy of moisture content with an attendant greater uniformity in softness, flexibility, etc. under varying climatic conditions.

As a consequence of the foregoing, greater softness can be obtained by the use of sorbitol than by the use of glycerine for softening regenerated cellulose without obtaining a sticky surface on the same. Because of the greater uniformity of the moisture content of the sorbitol softened regenerated cellulose with varying humidities, it is possible to apply sufficient softening agent to impart maximum flexibility under conditions of low humidity without danger of objectionable stickiness or undue increase in length or area under conditions of high humidity. In addition, regenerated cellulose softened with sorbitol has an appearance of greater weight than regenerated cellulose softened with glycerine, which results in better salability, etc.

Regenerated cellulose sheeting softened by means of aqueous sorbitol transmits much less water vapor through it than does regenerated cellulose sheeting softened with glycerine. Sorbitol treated regenerated cellulose sheeting transmits only about 50% of the moisture transmitted by glycerine softened regenerated cellulose sheeting under the same conditions. This property of regenerated cellulose treated with aqueous sorbitol cannot be accounted for, and is wholly unpredictable from the known properties of sorbitol, but is very valuable since it enables one very frequently to dispense with the usual costly process of moistureproofing by lacquering the regenerated cellulose sheeting. This is possible where a sheeting which is not completely impermeable to moisture vapor is satisfactory. Thus sorbitol softened regenerated cellulose with its lower moisture vapor transmission may profitably be used where rigid moistureproofness is not required but where the extreme permeability of glycerine softened regenerated cellulose is objectionable. This makes possible, in many cases, the elimination of the conventional additional expensive steps of lacquering, drying and steaming the regenerated sheet material.

The sorbitol softened regenerated cellulose retains its flexibility, suppleness, softness and desirable properties for an indefinite period even when subjected to elevated temperatures. This is to be contrasted with the appreciable loss of glycerine from glycerine softened regenerated cellulose by volatilization. Thus, at room temperature (30° C.) a sheet of regenerated cellulose containing 30.5% of glycerine lost 2.6% of its original glycerine content in 90 hours, and at 40° C. it lost 7.5%, whereas a sheet of regenerated cellulose softened with sorbitol lost none of its sorbitol content under either of these tests. For softening regenerated cellulose sheets, films and filaments where permanent softening is desired, the evaporation of glycerine is a serious disadvantage which is completely overcome by the use of an aqueous solution of sorbitol.

Instead of using pure solid sorbitol as the starting material, there may be employed technical sorbitol syrup such as may be obtained by the reduction of glucose and treatment of the reduction liquor so as to recover therefrom a relatively viscous aqueous syrup containing in addition to sorbitol, related polyhydroxy bodies such as saccharitols, sodium salts of hydroxy-carboxylic acids containing 4 to 6 carbon atoms, such as lactic acid, saccharinic acids, and similar acids, tetrahydric alcohols and monoanhydrohexitols, and which may contain unreduced sugar, mannitol and sodium sulphate and preferably containing at least 5% and not over 20% of water. An example of such a syrup is the following:

| | Per cent |
|---|---|
| Sorbitol | 65.0 |
| Saccharitols | 16.0 |
| Sodium salts of hydroxy-carboxylic acids | 7.0 |
| Tetrahydric alcohols | 4.5 |
| Monoanhydrohexitols | 4.5 |
| Sodium sulphate | 1.5 |
| Unreduced sugar | 1.5 |
| Mannitol | 0.0 |

The above percentages are by weight on a dry or water-free basis, and the ingredients are in solution in such proportion of water as to form a syrup containing at least 5% and not over 20% of water.

It will be understood that the above specific example is not limiting, and that the proportions of the several components in the syrup are subject to wide variations. The sorbitol content may be less than 50%, if desired.

It has also been found that the hygroscopic water-soluble anhydro derivatives of sorbitol produce the same results as the use of sorbitol itself. These comprise monoanhydro sorbitol, which is a monoanhydrohexitol, more commonly known as sorbitan and dianhydro sorbitol, more commonly known as sorbide. These anhydro derivatives of sorbitol are very closely related to sorbitol and have very similar properties, being extremely soluble in water, hygroscopic and exerting the same softening action on regenerated cellulose.

In carrying out the invention, sorbitol, either in the solid form or in the form of the technical syrup above described, or the anhydro derivative of sorbitol, is dissolved in, or, in the case of the syrup, diluted with, water so as to form a solution containing 10 to 40% solids by weight. The regenerated cellulose is treated with the resulting solution in any desired manner, such as by being immersed into the solution, the impregnated regenerated cellulose being then squeezed to remove the excess, and allowed to dry, whereupon it is ready for use. If desired, the softening material may be incorporated at any suitable stage in the manufacture of the regenerated cellulose. Thus, it may be applied to the regenerated cellulose as it comes from the regenerating bath and after removal of the precipitating agent while it is in a wet or gel state.

Examples of several preferred embodiments of the invention will now be given.

Example 1

A regenerated cellulose sheet, which had not been treated with a softening agent was immersed in an aqueous solution containing 20% of pure sorbitol by weight. The excess solution was removed from the sheet by passing it through squeeze rolls. The sheet was then allowed to dry. The dry sheet analyzed 30% of sorbitol by weight on a dry basis. It was very soft and flexible and free of tackiness even when subjected to atmospheres of very high humidity.

It will be understood that the percentage of sorbitol in the finished sheet may vary from that set forth in Example I, but will generally be maintained below 40%. It will of course be obvious that the process will be varied to produce the desired concentration in the finished sheet.

Example 2

A regenerated cellulose sheet identical with that described in Example 1 was immersed in a solution obtained by diluting technical sorbitol syrup of the type above described with water until a solution containing 20% of solids was obtained. The treated sheet was passed through squeeze rolls and dried. A product equal in every way to that obtained by the technique described in Example 1 was obtained.

Example 3

A sheet of regenerated cellulose (unsoftened) was immersed in an aqueous solution of sorbide (20% by weight) which is the dianhydro derivative of sorbitol. The sheet was pressed between rolls to remove the excess of solution and was allowed to dry. A very soft, pliable and flexible sheet was obtained.

Although it is indicated by the examples that it is preferred to apply the sorbitol or its water soluble hygroscopic anhydro derivatives to the regenerated cellulose by immersing the latter in an aqueous solution of the former, it will be understood that equivalent modes of application may be used without departing from the spirit of the invention. Solvents other than water may be employed, if desired. The softener may be applied also by spraying or by any other method which produces a uniformly impregnated material. Different concentrations from those specified may be used. If desired, penetrants may be used in conjunction with sorbitol to accelerate the impregnation of the regenerated cellulose.

This application is a continuation in part of our prior and copending application Serial No. 718,514, filed March 31, 1934.

Having described our invention, what we claim is:

1. Regenerated cellulose having relatively constant flexibility and softness with widely varying humidity by reason of being treated with sorbitol syrup containing a relatively large proportion of sorbitol and in addition substantial proportions of each of saccharitols, sodium salts of hydroxy-carboxylic acids containing 4 to 6 carbon atoms, tetrahydric alcohols and monoanhydrohexitols, in amount sufficient to impart flexibility and softness thereto.

2. Regenerated cellulose having relatively constant flexibility and softness with widely varying humidity by reason of being treated with sorbitol syrup of the following analysis on a dry basis:

| | Percent by weight |
|---|---|
| Sorbitol | 65.0 |
| Saccharitols | 16.0 |
| Sodium salts of hydroxy-carboxylic acids | 7.0 |
| Tetrahydric alcohols | 4.5 |
| Monoanhydrohexitols | 4.5 |
| Sodium sulphate | 1.5 |
| Unreduced sugar | 1.5 | in amount sufficient to impart flexibility and softness thereto.

JAMES T. POWER.
ERNEST G. ALMY.